N. NILSON.
SCALE.
APPLICATION FILED AUG. 7, 1911.

1,193,711.

Patented Aug. 8, 1916.
2 SHEETS—SHEET 1.

WITNESSES

INVENTOR
NILS NILSON
BY Paul & Paul
ATTORNEYS

N. NILSON.
SCALE.
APPLICATION FILED AUG. 7, 1911.

1,193,711.

Patented Aug. 8, 1916.
2 SHEETS—SHEET 2.

WITNESSES

INVENTOR
NILS NILSON
BY Paul & Paul
ATTORNEYS

UNITED STATES PATENT OFFICE.

NILS NILSON, OF WAYZATA, MINNESOTA.

SCALE.

1,193,711.   Specification of Letters Patent.   Patented Aug. 8, 1916.

Application filed August 7, 1911. Serial No. 642,808.

*To all whom it may concern:*

Be it known that I, NILS NILSON, of Wayzata, Hennepin county, Minnesota, have invented certain new and useful Improvements in Scales, of which the following is a specification.

My invention relates to scales for weighing commodities of various kinds and the object of the invention is to provide a scale which will be extremely sensitive and delicate in operation and capable of weighing accurately not only a heavy article but an extremely light one, to the end that I am able to weigh with a single scale articles which ordinarily require the use of two scales.

Other objects of the invention will appear from the following detailed description.

The invention consists generally in various constructions and combinations, all as hereinafter described and particularly pointed out in the claims.

Figure 1:
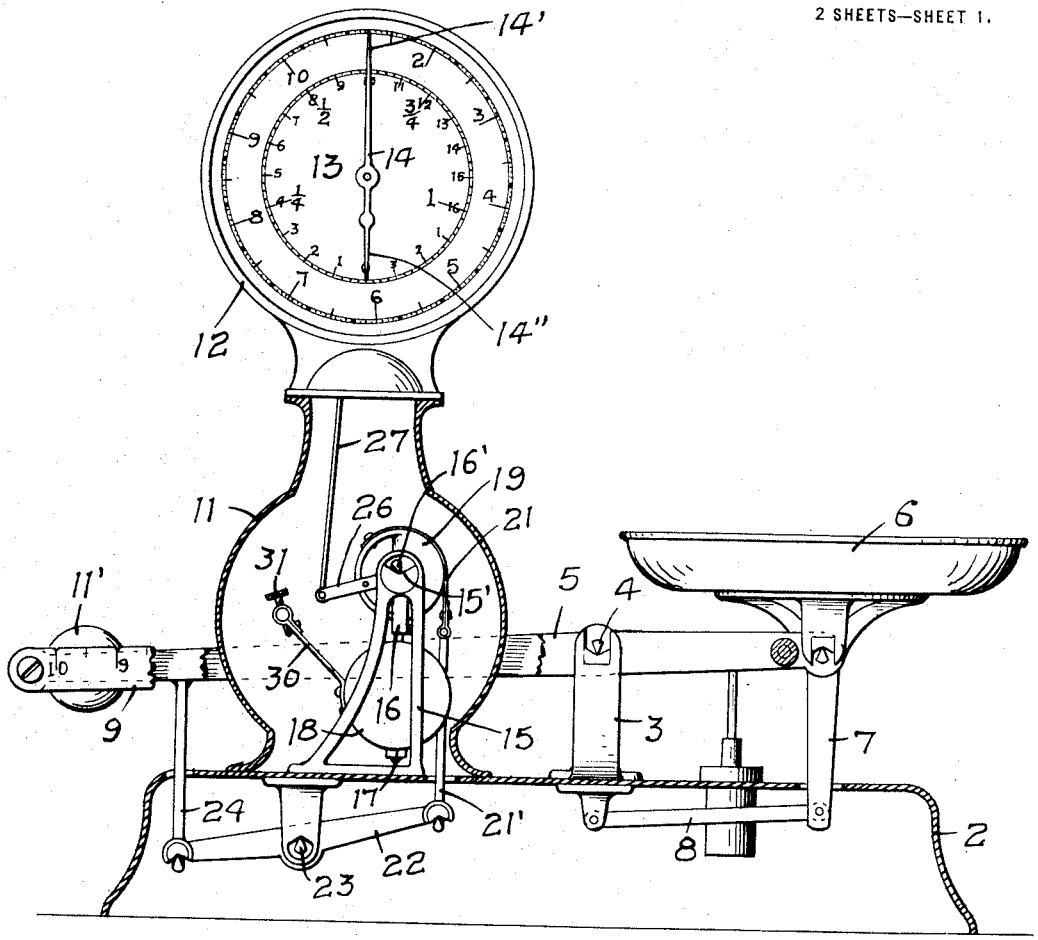
Figure 2:
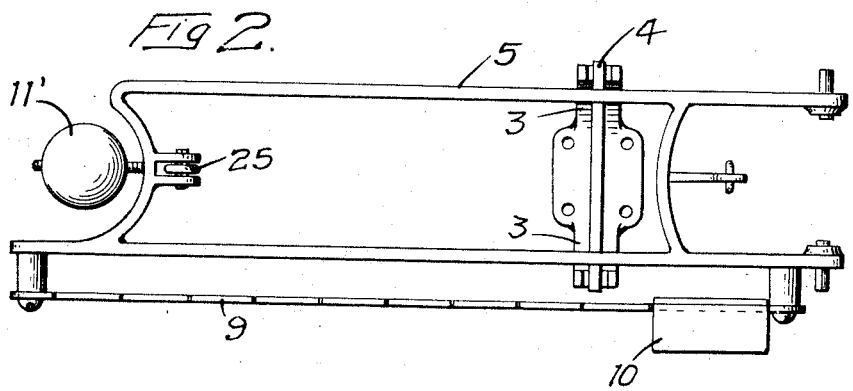
Figure 3:
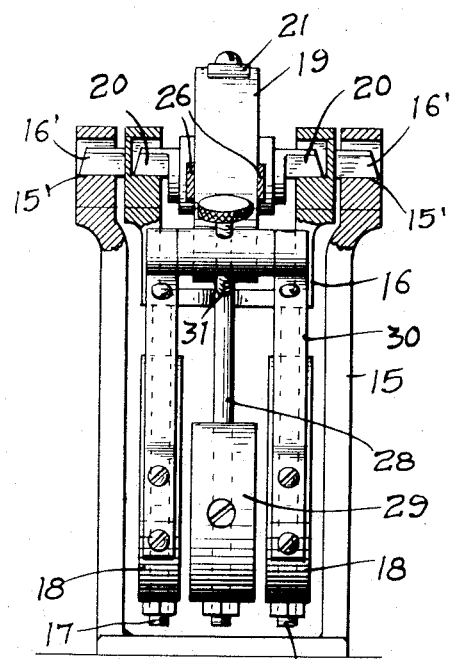
Figure 4:
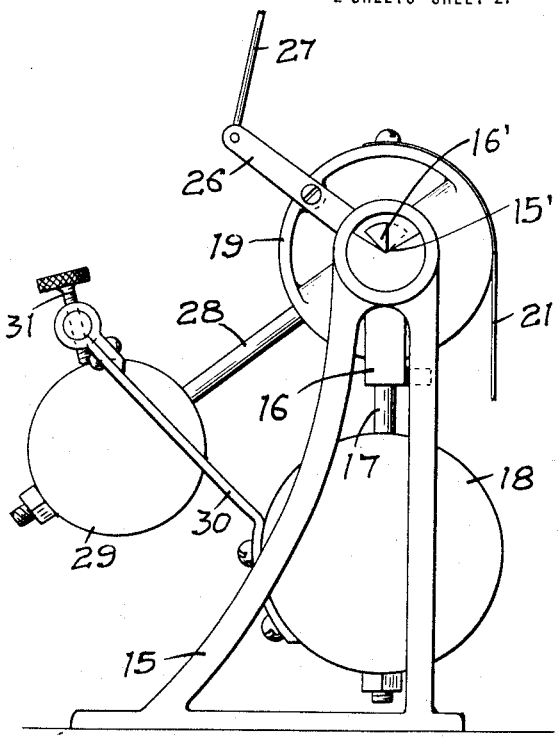
Figure 5:
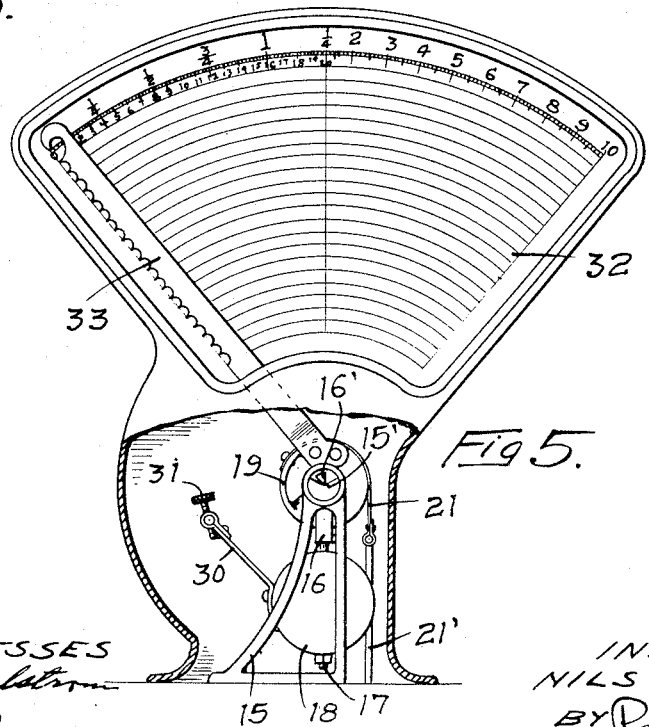

In the accompanying drawings forming part of this specification, Figure 1 is a vertical sectional view of a weighing scale embodying my invention, Fig. 2 is a detail plan view of the scale beam and the frame supporting it, Fig. 3 is a transverse sectional view showing the weights which are actuated by the load on the beam, Fig. 4 is a detail view illustrating one of the swinging weights moved from its normal position by the load of a comparatively light article on the scale pan, Fig. 5 is a detail view showing the invention applied to a scale equipped with a curved dial and pendulum.

In the drawing, 2 represents a suitable base and 3 standards mounted thereon having knife edge bearings 4 for a beam frame 5. This frame extends beyond the standards on both sides and one end supports a scale pan 6 having a depending arm 7 that is pivotally connected with the base of the scale by a link 8, the function of which is to hold the scale pan in its horizontal position during the tilting movement of the beam. A beam proper 9 is preferably secured to one side of the beam frame 5, (see Fig. 2), suitably graduated and carrying a poise 10 that is adapted to be moved back and forth on the beam. A weight 11' is provided at one end of the beam frame to counter-balance the weight of the scale pan at the opposite end of the beam. The beam frame incloses a housing 11 in which the weighing mechanism is disposed, said housing supporting a suitable casing 12 provided with a dial 13. This dial is provided with concentric circles of graduations, the outer circle being graduated for pounds and the inner circle for ounces and fractions thereof up to one pound and one quarter, preferably. An indicator hand 14 is provided, having one end 14' adapted to move over the outer circle of graduations and the opposite end 14'' over the inner circle of graduations.

Mounted on the base of the scale are standards 15, having knife edge bearings 15' for a yoke 16. This yoke is substantially U-shaped in form and has arms 17 depending therefrom upon which weights 18 are secured. These weights are of the same size and are the same distance from the pivotal center of the yoke 16. A wheel or disk 19 is arranged between the arms of the yoke 16 and has knife edge bearings 20 on said yoke, concentric with the bearings 16' of the yoke on the standards 15. A strap 21 is secured to the periphery of the wheel 19 and to a link 21' which depends through the top of the base 2 and has a knife edge bearing on one end of a lever 22 centrally pivoted at 23 in the scale base and having a link 24 at its opposite end which extends up through the base and has a pivotal connection at 25 with the beam frame. The movement of the beam frame and beam is thereby transmitted through the lever 22 to the wheel 19. This wheel has an arm 26 mounted thereon and a rod 27 connects said arm with the spindle of the indicator hand 14. Oscillation of the arm 26, therefore, will impart a rotary movement to the spindle and indicator hand and move the hand back and forth over the dial. The wheel 19 is provided with an arm 28 and a weight 29 is mounted on said arm and adjustable back and forth thereon and is adapted to swing outwardly from a vertical to a position inclined to the vertical when the wheel is rocked by the weight of an article on the scale beam. The weight 29 is utilized in weighing light articles, the scale beam tilting under the weight of the load swinging the weight 29 outwardly and moving the indicator hand over the dial until it points to the weight of the article.

To adapt the scale for weighing heavy articles without further adjustment, I mount a loop 30 on the weights 18, the weight 29 swinging in the space between the arms of the loop back and forth from its normal vertical position to the position shown in Fig. 4, until the weight 29 contacts with the adjusting screw 31. At this point, if the load on the scale is sufficiently heavy to cause further movement of the weight 29, the weights 18 will be swung outwardly from their normal position, automatically increasing the poise and counter-acting the increased load on the scale pan. If the article on the scale weighs somewhere between three and four pounds, the weight 29 will be swung outwardly until it contacts with the adjusting screw 31 and further movement of the weight 29 will swing the weights 18 until the scale comes to a balance. The operator may then move the poise 10 out on the scale beam to the three pound mark, whereupon the indicator hand 14 will turn back on the dial until the end 14″ points to the fraction of the fourth pound on the inner circle of graduations. In other words, I am able with this scale to weigh a comparatively light article accurately, using the weight 29 and the inner circle of graduations, and for heavier articles the weighing will be performed with equal accuracy in pounds, ounces and fractions of ounces by merely adjusting the beam poise of the scale. I am thus able to weigh a light article very accurately and also weigh a heavy article on the same scale, the weight of both being carried out in fractions of ounces. I thus combine in one scale a weighing mechanism which ordinarily requires two scales. I may also utilize the poise of the beam and the indicator hand to weigh an article that would be too heavy to be weighed by either one alone. For instance, if the beam 9 is graduated to ten pounds the poise may be set at this point, and when the scale comes to a balance the weight indicated on the dial added to the ten pounds of the beam, will be the true weight of the load on the scale.

In Fig. 5 there is shown a modification which consists in providing a dial 32 graduated on one side of a point near the center for ounces and fractions thereof, and on the other side of the middle line graduated for pounds. The pendulum 33 is secured on the wheel 19 and is adapted to swing back and forth over the graduations of the dial as the wheel is oscillated. The dial is also graduated for use as a price scale. The graduations on the left-hand side of the middle line are, as stated, graduated in fractions of ounces up to one and a quarter pounds. Beginning with the one and a quarter pound graduation the scale is marked for pounds and fractions thereof up to ten, or any other suitable number of pounds for a scale of this type.

I prefer to graduate the ounce portion of the scale to a point between one and two pounds so that in weighing a single pound at the left-hand end of the graduations, the marks in excess of the pound graduations will allow for a slight variation in the weight and the wavering of the pendulum, which may pass beyond the pound mark. In weighing the article on the scale with this pendulum attachment, the indicator, assuming that the article weighs more than two pounds, will move past the middle line of the scale and stop at a point, say between the four and five pound marks. The operator may then move the poise out on the beam to the four pound mark whereby the pendulum will drop back to the fractions of ounce graduations on the scale and indicate exactly the weight in ounces and fractions thereof in excess of four pounds.

I do not limit myself to the details of construction herein shown and described, as the same are intended only to represent the preferred form of my invention, and it is obvious that the details of structure and arrangement may be modified in many particulars without departing from my invention.

I claim as my invention:—

1. A scale comprising a graduated beam having a pivot and a scale platform, a dial having groups of graduations thereon and an indicator hand therefor, a weighted rocking device connected with said indicator, flexible means connecting said rocking device with said beam, a poise for said beam, and a suitable counter-balance for said platform, said indicator moving over one group of graduations when the load on said platform exceeds a predetermined weight indicating approximately the adjustment of the poise on said beam, said indicator moving over the other group of graduations when the poise has been adjusted on said beam to indicate the weight of the load in ounces and fractions thereof, plus the weight balanced by the adjustment of said poise and means for augmenting the rate of increasing resistance to the movement of said rocking device at a predetermined point in its travel.

2. A scale comprising a beam having pivots, a scale pan supported on said beam on one side of said pivots, a dial having an inner and outer circle of graduations, an indicator hand therefor, an oscillating yoke having bearings, weights carried by said yoke, a wheel having bearings in said yoke, a weight carried by said wheel, flexible means connecting said wheel with said beam, means operatively connecting said wheel with said indicator hand, the weight of a comparatively light article on said pan oscillating said wheel and weight to move said indicator hand, and means in the path of said wheel weight and connected with said yoke weights for oscillating them also to balance a heavier load on the scale pan.

3. A scale comprising a beam having a pivot and scale pan, a dial having groups of graduations thereon, an indicator for said dial, means operatively connecting said indicator hand with said beam, a poise for said beam and a counter-balance for said pan, said indicator moving over one group of graduations when the load on the pan exceeds a predetermined weight indicating approximately the proper adjustment of the poise of said beam, said indicator moving over the other group of graduations when the poise has been adjusted on the beam to indicate the weight of the load plus the weight balanced by the adjustment of said poise and means for augmenting the rate of increasing resistance to the movement of said rocking device at a predetermined point in its travel.

4. A scale, comprising a beam and a scale pan, a dial having graduations representing fractions of ounces, and also a graduation representing pounds, an indicator movable back and forth over said graduations, a rocking wheel connected with said indicator, a weight carried by said wheel, flexible means connecting said wheel with said beam, a poise for said beam and a counter balance for said pan, said indicator moving over said pound graduations when the load on the pan exceeds a predetermined weight, indicating approximately the adjustment of the poise of said beam, said indicator moving over said ounce graduations when the poise has been adjusted on the beam to indicate the weight of the load in ounces and fractions thereof, plus the weight balanced by the adjustment of the poise.

5. In a scale, upright standards, a yoke having knife edged pivots thereon, weights carried by said yoke, a wheel having knife edged pivots in said yoke concentric with the pivots of said yoke in said standards, a weight carried by said wheel, means connected with said wheel for attachment to the scale beam and means in the path of said wheel weight for oscillating said yoke weights at a predetermined point.

6. In a scale, the combination, with a base, a scale beam pivoted thereon, upright standards mounted on said base, a yoke having knife edged bearings on said standards, weights carried by said yoke, a wheel fitting within the arms of said yoke and having knife edged bearings thereon concentric with the bearings of said yoke, a weight carried by said wheel, means connecting said wheel with said beam, and means connected with said yoke weights and located in the path of said wheel weight to be actuated thereby.

7. In a scale, the combination, with a base and a scale beam mounted thereon, and standards supported on said base, a yoke having pivots in said standards, weights carried by said yoke, a wheel having pivots in said yoke concentric with the pivots of said yoke on said standards, means connecting said wheel with said scale beam, a strap U-shaped, substantially, in form, attached to said yoke weights and intersecting the path of said wheel weight, and an adjusting screw carried by said strap in position to contact with said wheel weight, said wheel weight moving with the initial tilting of said beam under a light load and engaging said engaging screw to oscillate said yoke weights to balance a heavier load on said beam.

8. A scale comprising a beam and platform, a dial, an indicator hand therefor, a pivoted balance weight, flexible means connecting the pivots of said balance weight with said beam, means operatively connecting said balance weight with said indicator hand, said weight being oscillated by the load of a comparatively light article placed on the same platform, and means having its pivots concentric with the pivots of said balance weight and operating to resist movement of said balance weight at a predetermined point in its travel.

9. A scale comprising a pivoted beam, a scale pan, a dial, an indicator hand therefor, a pivoted weight, a wheel having pivots concentric with the pivots of said weight, and supported thereby a balance weight carried by said wheel, flexible means connecting said wheel with said beam, means operatively connecting said wheel with said indicator hand, the weight of a comparatively light article oscillating said wheel and weight to move said indicator hand, and means connected with said first named weight and in the path of said balance weight to yieldingly resist the movement of said balance weight at a predetermined point in its travel.

10. A scale comprising a beam having pivots, a scale pan supported on said beam, a dial having groups of graduations thereon, an indicator hand therefor, a forked pendudum having weights thereon, a disk arranged between the forks of said pendulum, a weight carried by said disk, means connecting said disk with said beam, and means operatively connecting said disk with said indicator hand, the weight of a comparatively light article on said pan oscillating said disk and weight to move said indicator hand, and means in the path of said disk weight for oscillating said forked pendulum to balance a heavier load on the scale pan.

11. A scale comprising a beam, a dial and indicator hand therefor, a fork pendulum having weights and pivots, a disk arranged between the forks of said pendulum and having pivots concentric with the pivots of said pendulum, a weight means whereby said weight is eccentrically carried by said disk, means connecting said disk with said beam and means operatively connecting said disk with said indicator hand, said disk oscillating under a comparatively light load on the beam and means actuated by the movement of the disk beyond a predetermined point for oscillating said forked pendulum to balance a heavier load.

12. The combination, with a scale beam, of pendulums having concentric bearings and mounted for movement independently of one another, one pendulum having bearings for the bearings of the other pendulum, means connecting one pendulum with said scale beam, an indicating device and means connected with one pendulum and positioned to be engaged by the other pendulum at a predetermined point in its movement.

13. In a weighing scale, a scale beam, pendulums having concentric bearings, one pendulum supporting the bearings of the other pendulum, flexible means connecting one pendulum with said beam, an indicating device actuated by the movement of said beam connected pendulum and means in the path of said beam connected pendulum for actuating the other pendulum.

In witness whereof, I have hereunto set my hand this 28" day of July 1911.

NILS NILSON.

Witnesses:
 GENEVIEVE E. SORENSEN,
 EDWARD A. PAUL.